(12) United States Patent
Honji (10) Patent No.: US 9,452,944 B2
(45) Date of Patent: Sep. 27, 2016

(54) METHOD FOR MANUFACTURING OPTICAL ELEMENT, AND APPARATUS FOR MANUFACTURING OPTICAL ELEMENT

(71) Applicant: Olympus Corporation, Tokyo (JP)

(72) Inventor: Hironori Honji, Tokyo (JP)

(73) Assignee: Olympus Corporation, Hachioj1-shi, Tokyo (JP)

( * ) Notice: Subject to any disclaimer, the term of this patent is extended or adjusted under 35 U.S.C. 154(b) by 929 days.

(21) Appl. No.: 13/670,709

(22) Filed: Nov. 7, 2012

(65) Prior Publication Data

US 2013/0062795 A1    Mar. 14, 2013

Related U.S. Application Data (63) Continuation of application No. PCT/JP2011/056646, filed on Mar. 18, 2011.

(30) Foreign Application Priority Data

May 20, 2010  (JP) ................. 2010-116635

(51) Int. Cl.
| | |
|---|---|
| *B29D 11/00* | (2006.01) |
| *C03B 11/08* | (2006.01) |
| *C03B 11/12* | (2006.01) |
| *B29C 35/02* | (2006.01) |
| *B29C 35/04* | (2006.01) |

(52) U.S. Cl.
CPC ........... *C03B 11/08* (2013.01); *B29C 35/0244* (2013.01); *B29C 35/045* (2013.01); *B29D 11/00* (2013.01); *C03B 11/122* (2013.01); *C03B 2215/61* (2013.01); *C03B 2215/70* (2013.01)

(58) Field of Classification Search
CPC . C03B 11/08; C03B 11/122; C03B 2215/61; C03B 2215/70; B29D 11/00; B29C 35/0244; B29C 35/045
See application file for complete search history.

(56) References Cited

U.S. PATENT DOCUMENTS

| | | | |
|---|---|---|---|
| 5,275,637 A * | 1/1994 | Sato et al. ............... | 65/66 |
| 5,873,921 A | 2/1999 | Hirota et al. | |
| 6,009,725 A | 1/2000 | Hirota et al. | |
| 2002/0129620 A1 | 9/2002 | Hirota et al. | |
| 2003/0154744 A1 | 8/2003 | Hirota et al. | |
| 2005/0204777 A1* | 9/2005 | Mori ............... | C03B 11/08 65/112 |
| 2013/0042649 A1* | 2/2013 | Isono ............... | C03C 19/00 65/61 |

FOREIGN PATENT DOCUMENTS

| | | |
|---|---|---|
| JP | 08-133758 A | 5/1996 |
| JP | 2010-195012 A | 9/2010 |

OTHER PUBLICATIONS

International Search Report issued for PCT/JP2011/056646, date of mailing Apr. 12, 2011.

* cited by examiner

*Primary Examiner* — Mathieu Vargot
(74) *Attorney, Agent, or Firm* — Arent Fox LLP (57) ABSTRACT

A method for manufacturing an optical element includes floating an optical element material in gas to heat the optical element material, and thereafter making first and second shaping molds contact the floating optical element material at the same time, and pressurizing the optical element material by using the first and second shaping molds.

16 Claims, 12 Drawing Sheets

METHOD FOR MANUFACTURING OPTICAL ELEMENT, AND APPARATUS FOR MANUFACTURING OPTICAL ELEMENT

CROSS REFERENCE TO RELATED APPLICATION

This is a Continuation Application of PCT Application No. PCT/JP2011/056646, filed Mar. 18, 2011, which was not published under PCT Article 21(2) in English.

BACKGROUND OF THE INVENTION

1. Field of the Invention

The present invention relates to a method and an apparatus for manufacturing an optical element such as a lens, a prism, a mirror, etc.

2. Description of the Related Art

As a conventional method for manufacturing an optical element by heating and shaping an optical element material (heat softening material), a method has been employed as one of many widely accepted methods, in which a material or a material integrated with a retainer is heated so that the material is softened to a desirable level, the material is moved onto a press shaft (onto the shaping mold center shaft) so that the material is pressed.

In order to shape an optical element at a high accuracy, the temperatures of heated materials have to be kept consistent even when they are located in different places. However, it is very difficult to convey materials from a heating position to a desired position to shape them while keeping their temperature consistent.

Meanwhile, a method for manufacturing an optical element has been proposed in which a material is heated while it is floated in gas, is softened sufficiently, and thereafter is dropped onto a shaping mold so that the material is pressed (Japanese Laid-open Patent Publication No. 08-133758, for example).

SUMMARY OF THE INVENTION

A disclosed method for manufacturing an optical element includes floating an optical element material in gas to heat the optical element material, and thereafter making first and second shaping molds contact the floating optical element material at the same time, and pressurizing the optical element material by using the first and second shaping molds.

A disclosed apparatus for manufacturing an optical element includes a heating unit to float an optical element material in gas to heat the optical element material, and first and second shaping molds to be made to contact the optical element material at the same time, and to pressurize the optical element material.

DESCRIPTION OF THE PREFERRED EMBODIMENT

As has been described above, a method for manufacturing an optical element by floating a material in gas to heat it causes heat exchange between the material and the shaping model set below the material (lower mold), resulting in an uneven temperature distribution in the material. Such uneven temperature distributions in materials prevent highly accurate manufacturing of optical elements.

When, for example, the lower mold is higher in temperature than the material, local constituent volatilization of the material, or fusion bonding, is caused between the lower mold and the material. When the lower mold is lower in temperature than the material, cooling solidification is caused in contacting portions of the material before the shaping step starts, and insufficient shape transfer from the shaping mold occurs around the solidified portions.

Hereinafter, a method and an apparatus for manufacturing an optical element according to present embodiments will be explained by referring to the drawings.

Figure 1:
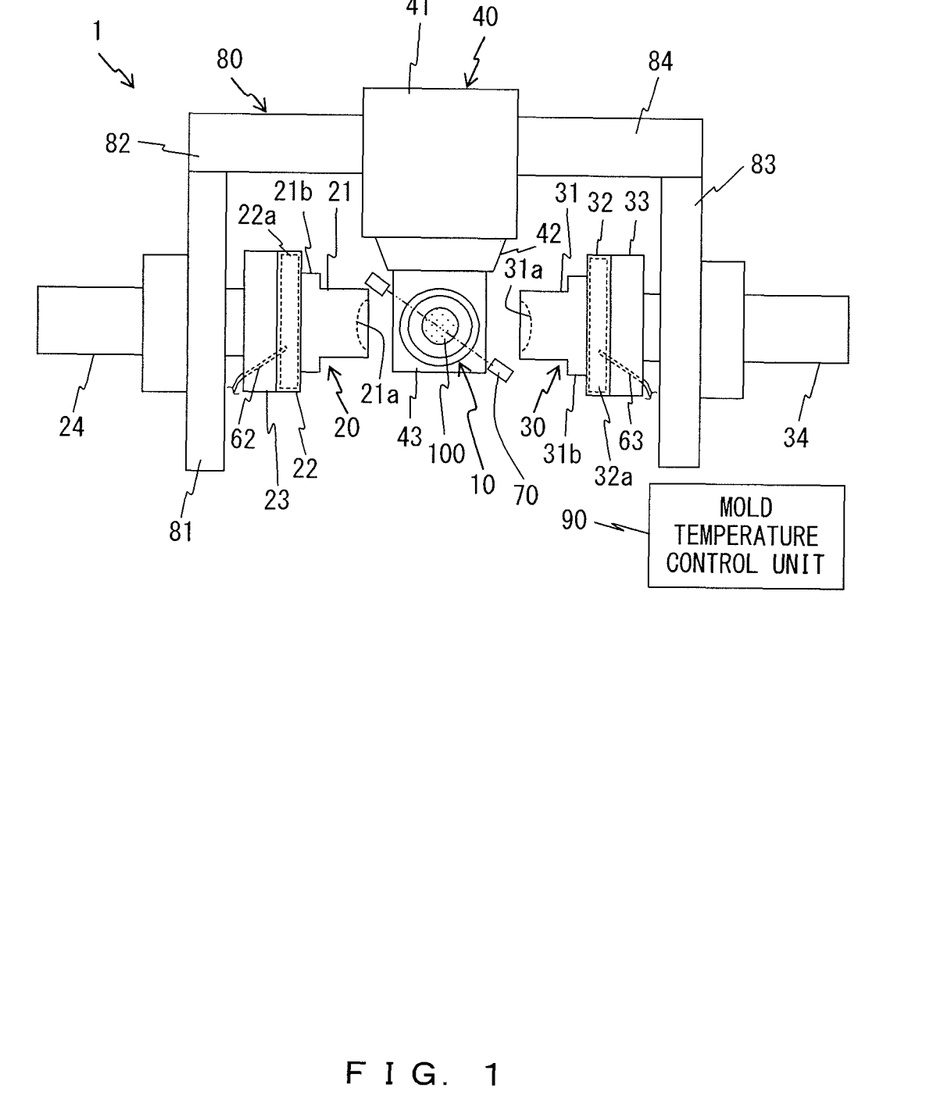
FIG. 1 is a schematic plan view showing an apparatus for manufacturing an optical element according to an embodiment of the present invention.
Figure 2:
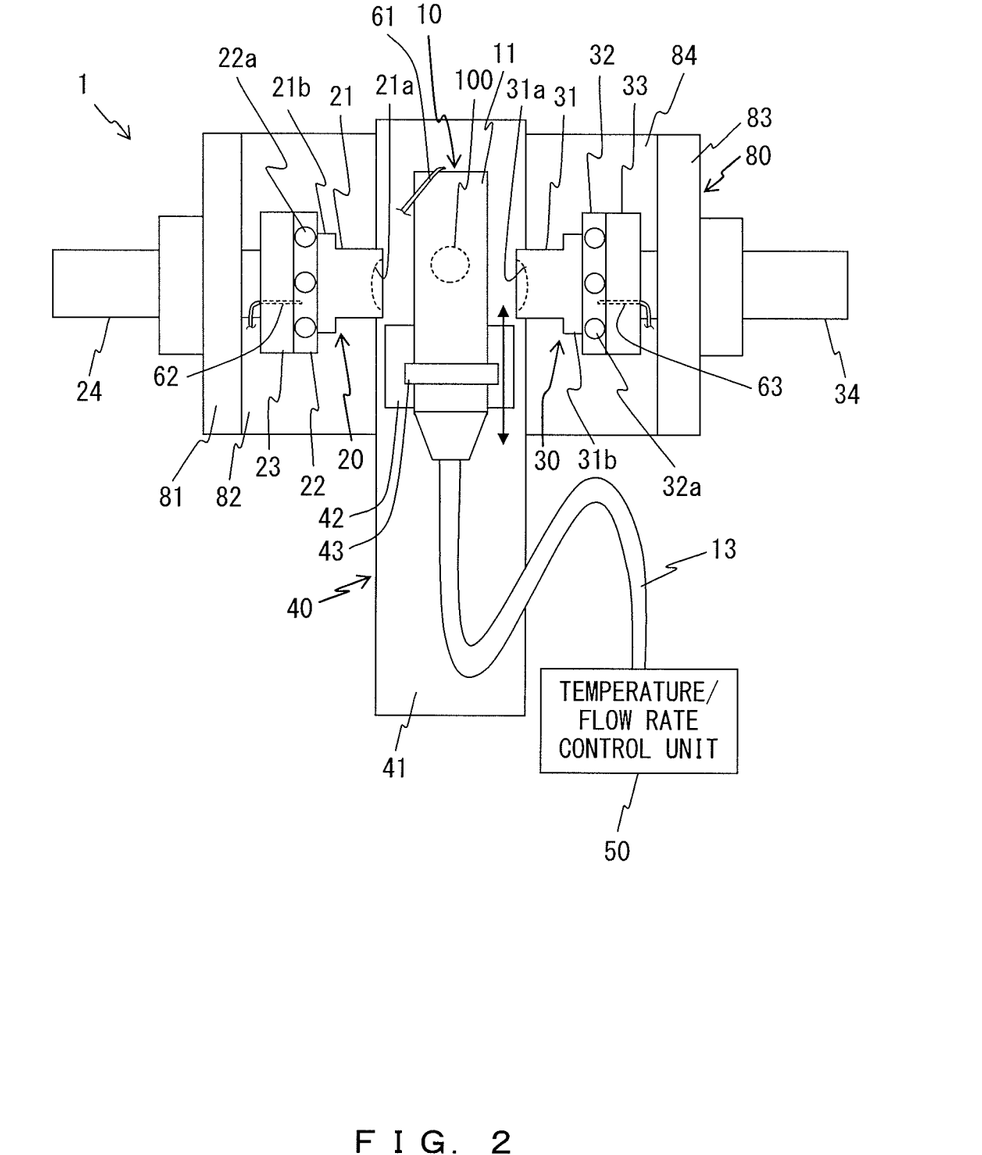
FIG. 2 is a schematic front view showing an apparatus for manufacturing an optical element according to an embodiment of the present invention.

FIGS. 1 and 2 are a schematic plan view and a schematic front view showing an optical element according to an embodiment of the present invention, respectively.

Figure 3:
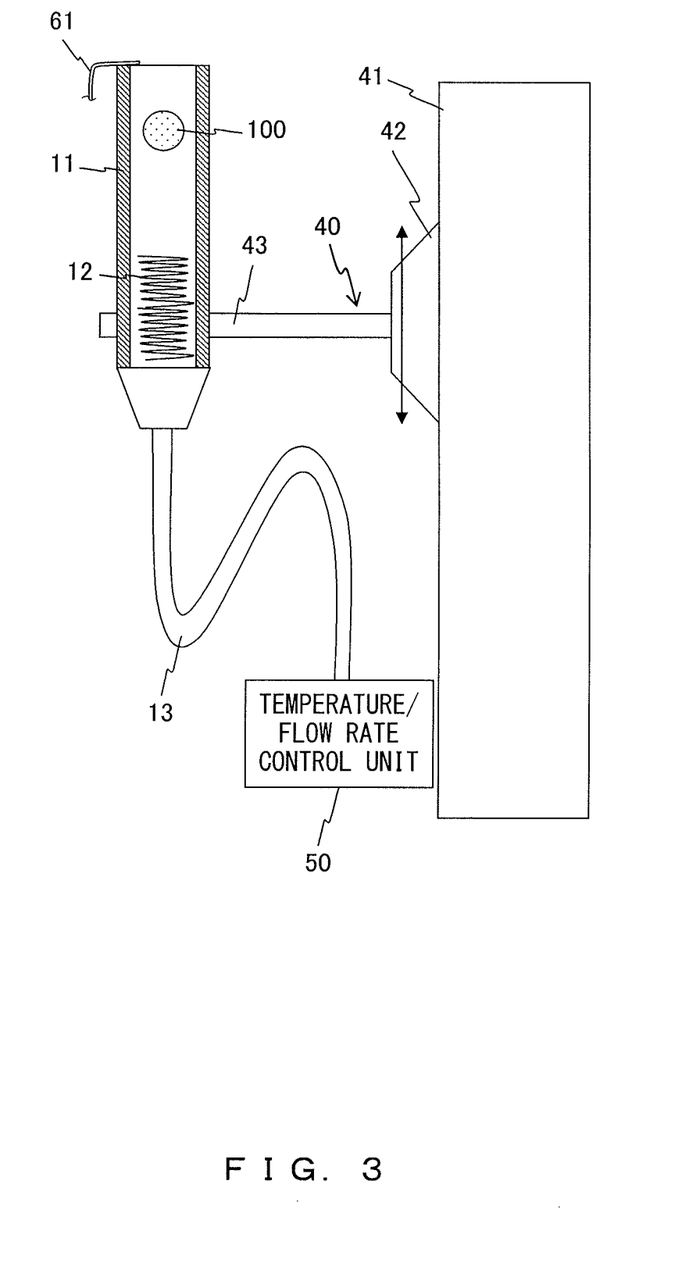
FIG. 3 is a partial cross-sectional view showing from the right side the internal structure of a heating unit of an apparatus for manufacturing an optical element according to an embodiment of the present invention.

FIG. 3 is a partial cross-sectional view showing the right side of the internal configuration or the like of a heating unit 10 of an optical element manufacturing apparatus 1.

As shown in FIGS. 1 through 3, the optical element manufacturing apparatus 1 includes the heating unit 10, a first pressurization unit 20, a second pressurization unit 30, a heating-unit moving mechanism 40, a temperature/flow rate control unit 50, a thermocouple 61, thermocouples 62 and 63, a transmission sensor 70, a frame 80, and a mold temperature control unit 90. The first pressurization unit 20 and the second pressurization unit 30 are arranged in such a manner that that they are opposite to each other. The temperature/flow rate control unit 50 is an example of a heating unit control unit. The thermocouple 61 is an example of a heating unit temperature detection unit. The thermocouples 62 and 63 are examples of a pressurizing unit temperature detection unit. The transmission sensor 70 is an example of an exposure detection unit.

As shown in FIG. 3, the heating unit 10 includes a main body 11 which is substantially cylindrical, and whose upper end as one of the two ends is open, an electric coil 12 set in the main body 11, and a gas supplying tube 13 for supplying gas to the main body 11.

The main body 11 is made of, for example, silica glass; however, it may be made of different materials that have resistance to the temperature at which an optical element material 100 is heated. The optical element material 100 is a glass material in a spherical shape that has the glass-transition temperature (Tg) of 506° C. in the present embodiment. However, other materials may be used, and other shapes may also be employed.

The electric coil 12 heats gas supplied from the temperature/flow rate control unit 50 to the main body 11 via the gas supplying tube 13. By blowing the heated gas onto the optical element material 100, the heating unit 10 floats the optical element material 100 in gas to heat it inside the main body 11. The amount of gas blown to the optical element material 100 may be determined appropriately depending upon the size of the optical element material 100, the main body 11, or the like, and is 5 L/min in the present embodiment. The structure of the heating unit 10 is not limited to the present embodiment as long as it is capable of floating the optical element material 100 in gas to heat it.

As shown in FIGS. 1 and 2, the first pressurization unit 20 and the second pressurization unit 30 have first and second shaping molds 21 and 31 that are opposite to each other, heater plates 22 and 32, heat insulation plates 23 and 33, and cylinders 24 and 34. The heater plates 22 and 32 are examples of a mold heater unit. The cylinders 24 and 34 are examples of a mold moving mechanism.

The first and second shaping molds 21 and 31 are substantially columnar. The first and second shaping molds 21 and 31 have, on their facing end planes, shaping surfaces 21a and 31a that are, for example, concave. Also, the first and second shaping molds 21 and 31 have greater-diameter parts 21b and 31b on their fixation ends, which are on the sides of the heater plates 22 and 32.

The heater plates 22 and 32 each have, for example, three columnar heaters 22a and 32a inserted into themselves, as shown in FIG. 2. The heater plates 22 and 32 are fixed to the heat insulation plates 23 and 33.

The thermocouples 62 and 63 that have pierced the heat insulation plates 23 and 33 are inserted into the heater plates 22 and 32. These thermocouples 62 and 63 detect temperatures of the heater plates 22 and 32. The mold temperature control unit 90 shown in FIG. 1 adjusts the heating temperature generated by the cylindrical heaters 22a and 32a in accordance with the detected temperature.

The cylinders 24 and 34 are fixed to left and right side walls 81 and 83 of the frame 80. Also, the driving of the cylinders 24 and 34 is controlled by a control unit (not shown), and the first and second shaping molds 21 and 31, the heater plates 22 and 32, and the heat insulation plates 23 and 33 are moved in horizontal directions, which are examples of directions that cross the vertical direction.

The cylinders 24 and 34 make the first shaping mold 21 and the second shaping mold 31 get closer to each other in the horizontal direction so as to make them contact the optical element material 100, and make the first shaping mold 21 and the second shaping mold 31 pressurize the optical element material 100. The structure of the first pressurization unit 20 and the second pressurization unit 30 is not limited to the present embodiment as long as they can pressurize the optical element material 100 in a floating state.

As shown in FIGS. 1 through 3, the heating-unit moving mechanism 40 includes a base unit 41, a slider 42, and a holding unit 43.

The base unit 41 is fixed to the frame 80 while being sandwiched in side walls 82 and 84 on the back plane side of the frame 80. A slider 42 is moved vertically upward along a guide rail (not shown) of the base unit 41 by a driving unit (not shown) set in the base unit 41.

The holding unit 43 holds the main body 11 of the heating unit 10 on its outer periphery. The holding unit 43 is fixed to the slider 42, and thus the main body 11 and the heating unit 10 are moved integrally with the slider 42.

The temperature/flow rate control unit 50 shown in FIGS. 2 and 3 supplies gas to the main body 11 of the heating unit 10 through a gas supplying tube 13 as described above. Also, the temperature/flow rate control unit 50 controls the temperature of gas heated by the electric coil 12 of the heating unit 10 on the basis of the temperature at the upper end inside the main body 11 of the heating unit 10. Also, it is preferable that the thermocouple 61 be fixed to the main body 11 so that it is movable in the vertical directions together with the heating unit 10.

The transmission sensor 70 shown in FIG. 1 detects exposure of at least part of the optical element material 100 to the outside of the heating unit 10 (main body 11) on the basis of whether or not light is transmitted or blocked. An exposure detection unit is not limited to the transmission sensor 70, and any device that can detect exposure of at least part of the optical element material 100 to the outside of the heating unit 10 may be used.

FIGS. 4A through 4D are schematic front views of the optical element manufacturing apparatus 1 for explaining the method for manufacturing an optical element according to the present embodiment.

In the following explanations given for the flow of manufacturing an optical element from the optical element material 100, similar points as in the above explanations will appropriately be omitted.

Figure 4A:
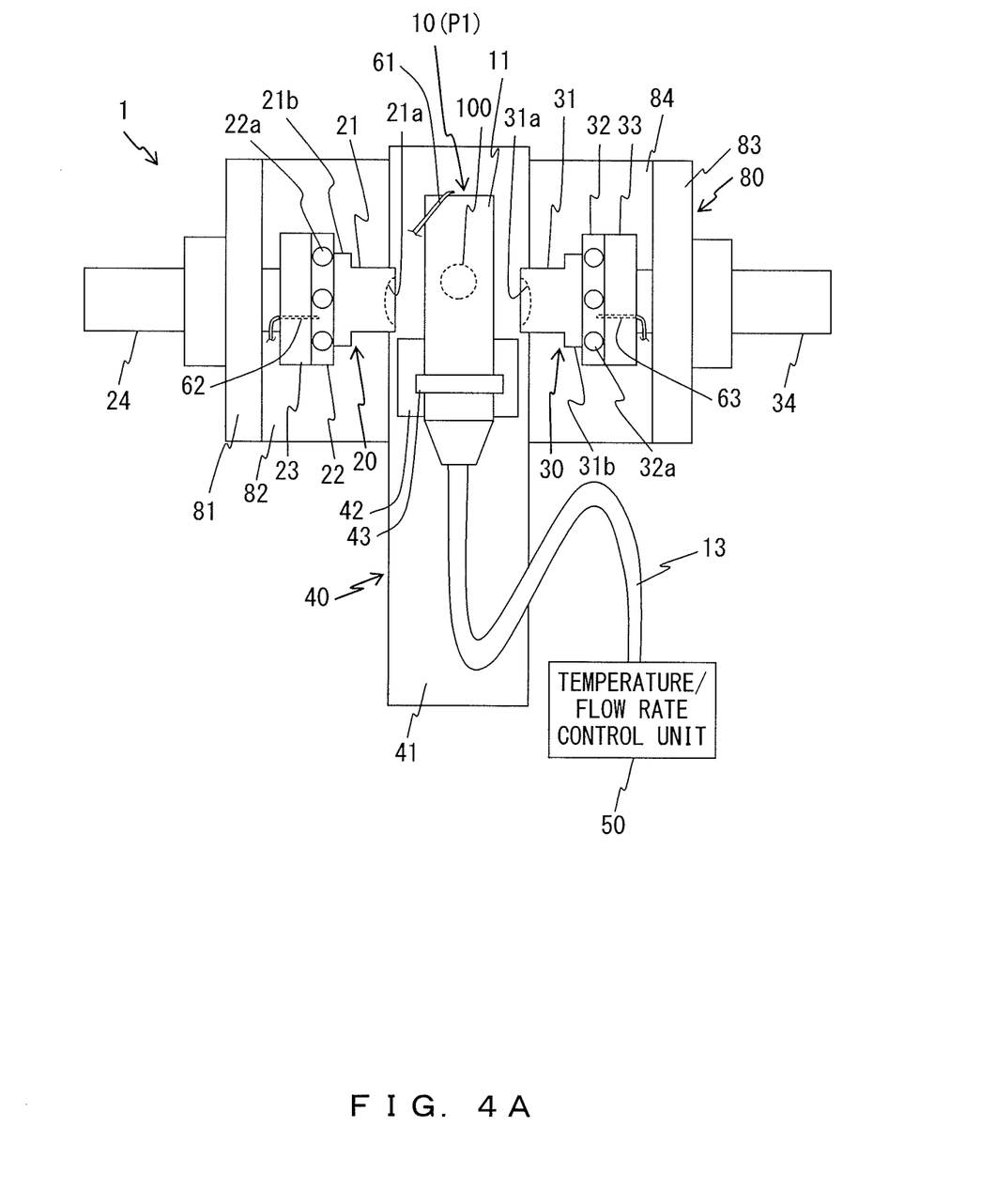
FIG. 4A is a first schematic front view of an apparatus for manufacturing an optical element used for explaining a method for manufacturing an optical element according to an embodiment of the present invention.

First, a conveying device (not shown) inserts from, for example, above the optical element material 100 into the main body 11 of the heating unit 10 at heating position (P1) shown in FIG. 4A.

The heating unit 10 heats gas to be supplied by the electric coil 12 from the temperature/flow rate control unit 50 to the main body 11 through the gas supplying tube 13. Thereby, heated gas is blown onto the optical element material 100. In this manner, the optical element material 100 floats the optical element material 100 in gas to heat it (heating step).

Figure 4B:
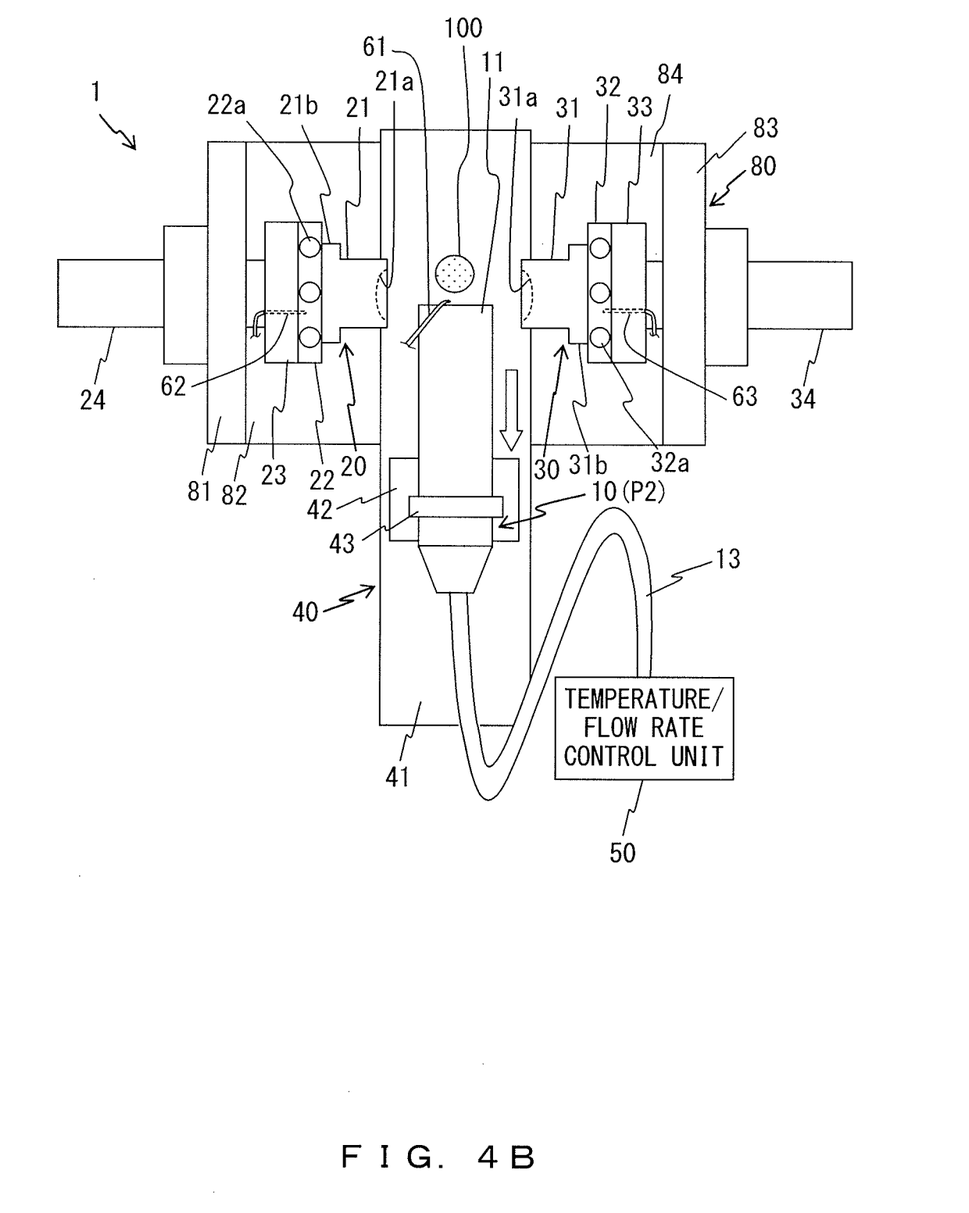
FIG. 4B is a second schematic front view of an apparatus for manufacturing an optical element used for explaining a method for manufacturing an optical element according to an embodiment of the present invention.

Thereafter, as shown in FIG. 4B, in the heating-unit moving mechanism 40, the slider 42 moves vertically downward at a speed higher than a speed at which the optical element material 100 falls by gravity. Thereby, the heating-unit moving mechanism 40 makes the heating unit 10, being held by the holding unit 43, move vertically downward (position P2), and exposes the optical element material 100 to the outside of the heating unit 10 (exposure step). The falling speed of the optical element material 100 is, for example, 1000 mm/s, and the speed of the heating unit 10 falling vertically downward is, for example, 2000 mm/s. When the optical element material 100 is not heated in the heating unit 10, i.e., when the optical element material 100 is heated in an exposed-to-outside state, the exposure step may be omitted.

Figure 4C:
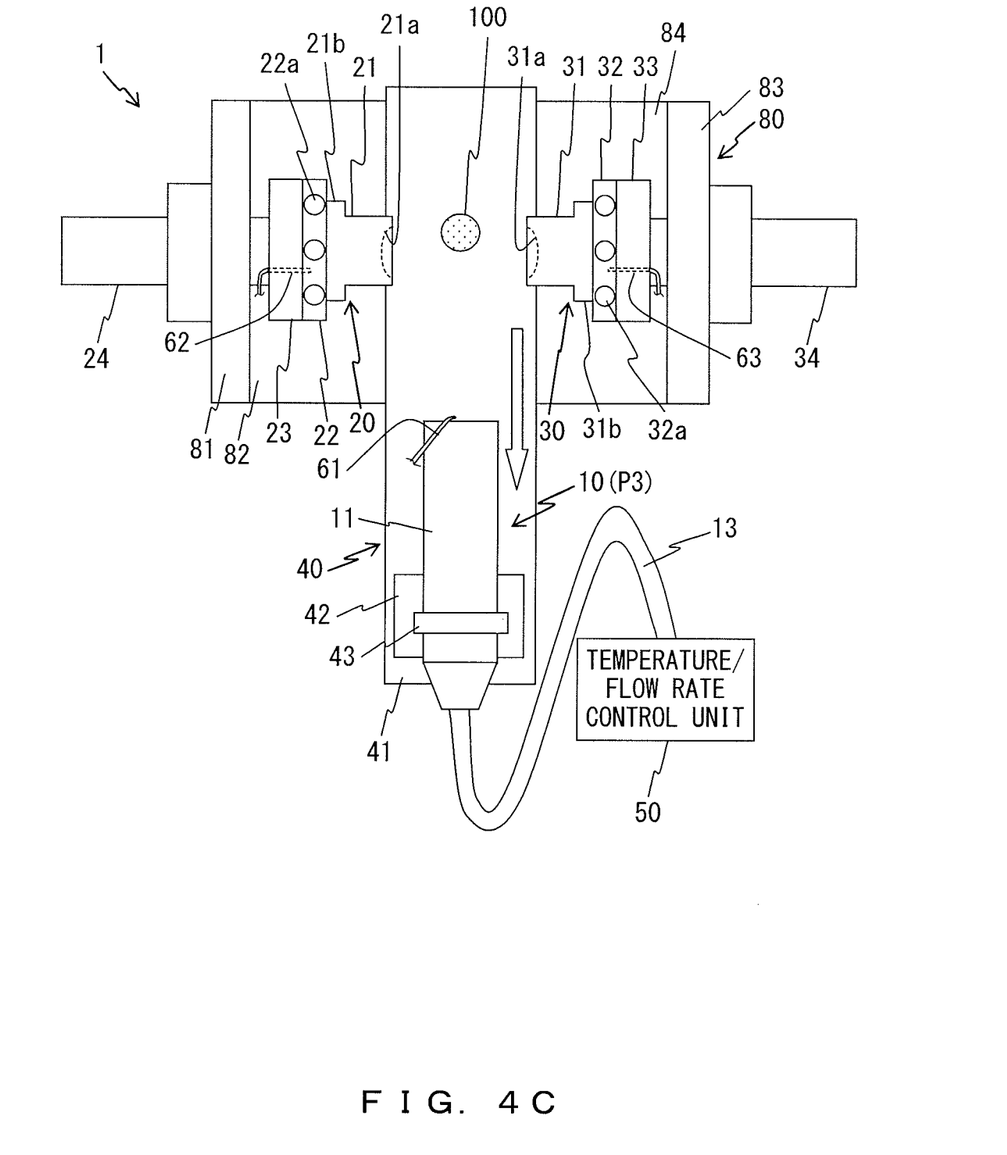
FIG. 4C is a third schematic front view of an apparatus for manufacturing an optical element used for explaining a method for manufacturing an optical element according to an embodiment of the present invention.

As shown in FIG. 4C, the slider 42 can be moved to position (P3) that is below a level at which the first pressurization unit 20 and the second pressurization unit 30 can be prevented from interfering with the main body 11. Thereby, it is possible to avoid a situation where heated air blown from the heating unit 10 reaches the first shaping mold 21 and the second shaping mold 31, thereby leading to uneven temperature distributions in the first shaping mold 21, the second shaping mold 31, and also in the optical element material 100.

The transmission sensor 70 shown in FIG. 1 detects a fact that at least part of the optical element material 100 has been exposed to the outside of the heating unit 10 (the main body 11) (exposure detection step) after the heating unit 10 has started moving. The transmission sensor 70 detects the exposure of the optical element material 100 by, for example, a fact that light that was blocked by the main body 11 of the heating unit 10 starts to be received by the light receiver unit accompanying the vertically downward movement of the heating unit 10 and thereafter the light is again blocked by the optical element material 100, which falls following the heating unit 10. It is also possible to omit the exposure detection step when the exposure step is omitted or when the exposure of the optical element material 100 is estimated on the basis of the time elapsed. In such a case, the transmission sensor 70 can also be omitted.

Figure 4D:
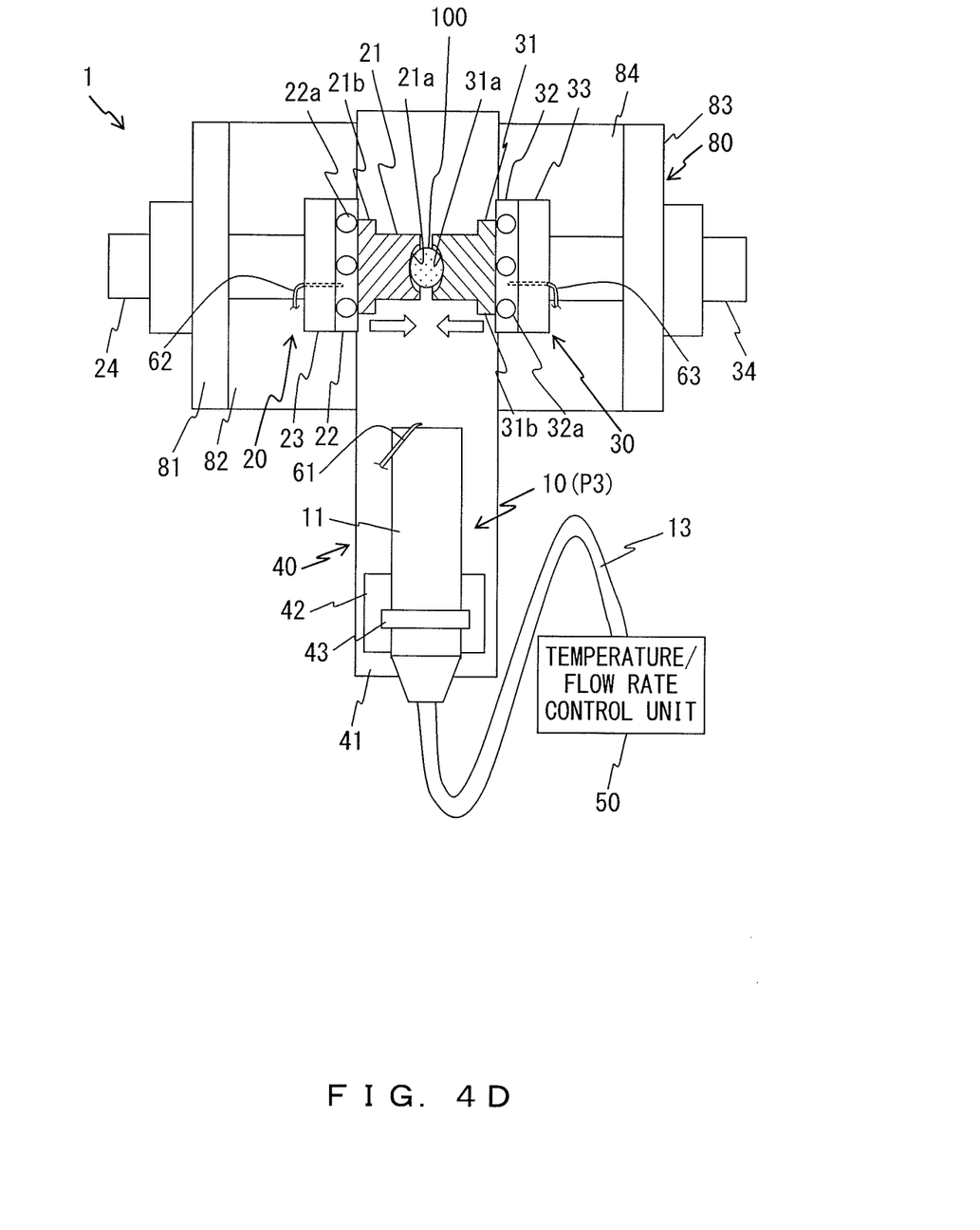
FIG. 4D is a fourth schematic front view of an apparatus for manufacturing an optical element used for explaining a method for manufacturing an optical element according to an embodiment of the present invention.

The first pressurization unit 20 and the second pressurization unit 30 make the optical element material 100 that has been exposed to the outside of the heating unit 10 (main body 11) to be floated contact the first shaping mold 21 and the second shaping mold 31 at the same time, and the first shaping mold 21 and the second shaping mold 31 pressurize the optical element material 100 (pressurization step). By making the first shaping mold 21 and the second shaping mold 31 contact the optical element material 100 at the same time, the first shaping mold 21 and the second shaping mold 31 can contact the optical element material 100 at the same time or at substantially the same time. "Same time" used here is within a range of 0.5 seconds, and "substantially the same time" is within a range of 2 seconds.

In order to prevent uneven temperature distributions from occurring in the optical element material 100, the above contact is desirably caused at the same time, and the shorter the time gap is, the better the result will be. However, even when there is a time gap, if the temperature difference is small between the optical element material 100 and the shaping mold that is contacted by the optical element material 100 first, contacting at "substantially the same time" can also prevent uneven temperature distributions.

The optical element material 100 is pressurized by the first shaping mold 21 and the second shaping mold 31 so that the concave shapes of the shaping surfaces 21*a* and 31*a* are transferred to the optical element material 100 as concave shapes.

When the first shaping mold 21 and the second shaping mold 31 are made to get closer to the optical element material 100, the cylinders 24 and 34 move the first shaping mold 21 and the second shaping mold 31 in the horizontal directions as directions that cross the direction of gravity so as to make them contact the optical element material 100. In this step, the cylinders 24 and 34 respectively move the first shaping mold 21 and the second shaping mold 31 at a speed higher than the falling speed of the optical element material 100. In such a case, the first shaping mold 21 and the second shaping mold 31 get closer to each other at a speed twice the falling speed of the optical element material 100 or higher. However, the optical element material 100 moves slightly downward from an exposing position due to gravity.

Thereafter, the optical element material 100 is cooled to, for example, the glass transition temperature or lower while being kept in the pressurized state (cooling step), and is conveyed out from the optical element manufacturing apparatus 1 by a conveying mechanism (not shown). By the above steps, an optical element is manufactured.

In the present embodiment described above, the method for manufacturing an optical element includes floating the optical element material 100 in gas to heat it, and thereafter making the first shaping mold 21 and the second shaping mold 31 contact the floating optical element material 100 at the same time, and pressurizing the optical element material 100 by using the first shaping mold 21 and 31.

Thereby, it is possible to prevent a situation where heat exchange occurs between the optical element material 100 and only one of the first shaping mold 21 and the second shaping mold 31, causing uneven temperature distributions in the optical element material 100. Accordingly, the present embodiment can prevent uneven temperature distributions from occurring in the optical element material 100 after the optical element material 100 has been floated in gas and heated.

Further, in the present embodiment, the method for manufacturing an optical element includes floating the optical element material 100 in gas to heat it, and this can also save energy compared to a case of heating the optical element material 100 through the shaping molds 21 and 31. The method also prevents uneven temperature distributions from occurring in the optical element material 100, making it possible to reduce the time for pressurizing the optical element material 100 by preventing partial solidification or the like.

Also, in the pressurization step according to the present embodiment, the cylinders 24 and 35 of the first pressurization unit 20 and the second pressurization unit 30 make the first shaping mold 21 and the second shaping mold 31 contact each other in directions that cross the vertical direction, and thereby makes them contact the optical element material 100. Thereby, the first shaping mold 21 and 31 can easily contact, at the same time or at substantially the same time, the optical element material 100 that is falling vertically downward by gravity.

Note that in order to make it easier to make the first shaping mold 21 and the second shaping mold 31 contact at the same time or at substantially the same time, the first shaping mold 21 and the second shaping mold 31 are made to get closer to each other in the directions desirably crossing the vertical direction, and more desirably in the directions orthogonal to the vertical direction (horizontal directions). However, by making the first shaping mold 21 and the second shaping mold 31 get closer to each other in the vertical directions, it is also possible to make the first shaping mold 21 and the second shaping mold 31 contact at the same time or at substantially the same time.

When, for example, the moving direction of the heating unit 10 is a direction that crosses the vertical direction, it is possible to make the first shaping mold 21 and the second shaping mold 31 contact each other at the same time or at substantially the same time by making the first shaping mold 21 and the second shaping mold 31 get closer to each other in the vertical directions.

Also, in the exposure step according to the present embodiment, the heating-unit moving mechanism 40 moves the heating unit 10 so as to expose the optical element material 100 to the outside of the heating unit 10. Thereby, it is possible to prevent uneven temperature distributions in the optical element material 100 that would be caused by, for example, airflow or the like more easily than a case where the optical element material 100 is moved by airflow to be exposed to the outside of the heating unit 10.

Also, in the exposure step according to the present embodiment, the heating-unit moving mechanism 40 moves the heating unit 10 vertically downward at a speed higher than the falling speed of the optical element material 100. This makes it easier to make the first shaping mold 21 and the second shaping mold 31 contact the optical element material 100 at the same time or substantially the same time.

Figure 5A:
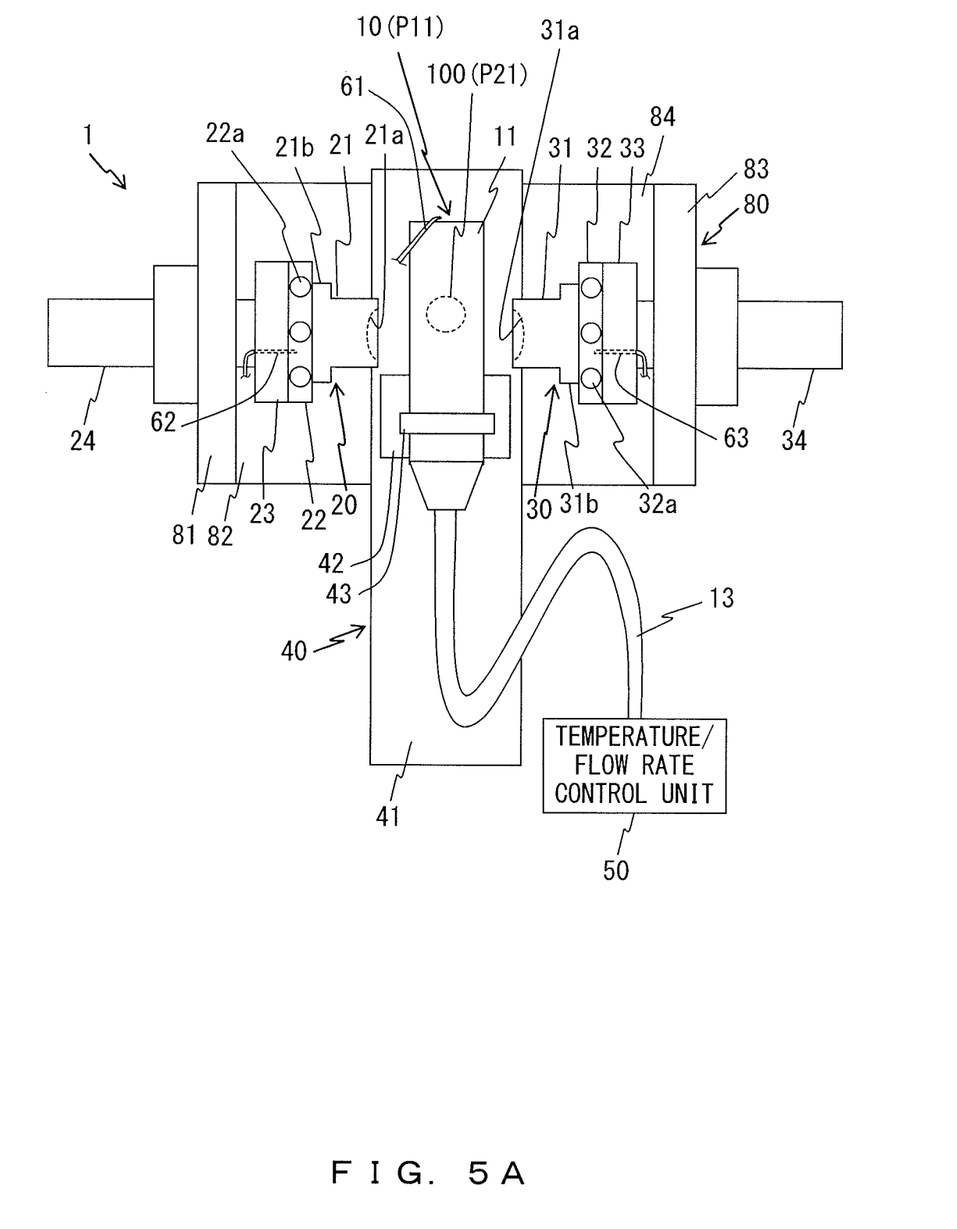
FIG. 5A is a first schematic front view of an apparatus for manufacturing an optical element used for explaining a method for manufacturing an optical element according to a variation example of the present invention.
Figure 5B:
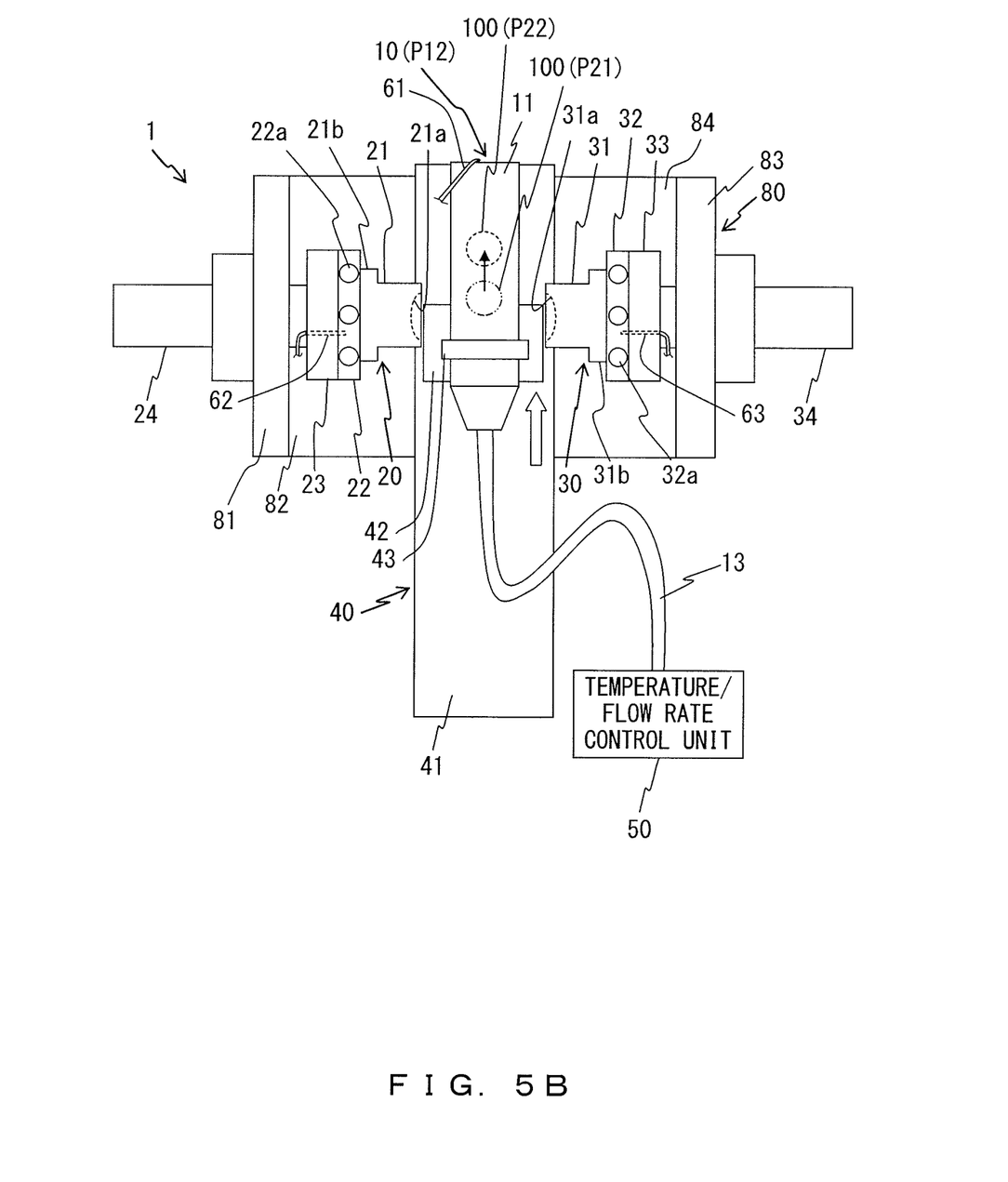
FIG. 5B is a second schematic front view of an apparatus for manufacturing an optical element used for explaining a method for manufacturing an optical element according to a variation example of the present invention.

As shown in the variation examples in FIGS. 5A and 5B, it is also possible in the exposure step to employ a configuration in which the heating unit 10 at heating position (P11) shown in FIG. 5A is moved upward to position (P12) shown in FIG. 5B, and thereafter the heating unit 10 is moved vertically downward at a speed higher than the falling speed of the optical element material 100.

As described above, the optical element material 100 is moved from heating position (P21) to position (P22), which is higher than position (P21), and accordingly it is easier to make the first shaping mold 21 and the second shaping mold 31 contact the optical element material 100 at the same time or substantially the same time. It is also possible to heat the optical element material 100 at a position in the main body 11 and in the vicinity of the upper end of the main body 11 in order to expedite the exposure of the optical element material 100.

It is also possible to move the optical element material 100 in a contactless manner to expose the optical element material 100 to the outside of the heating unit 10 in order to move the optical element material 100 to a higher position (P22). In such a case, the heating-unit moving mechanism 40 can be omitted. By, for example, increasing the amount of the heating gas to be blown to the optical element material 100, the optical element material 100 can be moved in a contactless manner. It is also possible to make the first shaping mold 21 and the second shaping mold 31 contact the optical element material 100 while it is, for example, moving upward instead of falling.

Figure 6A:
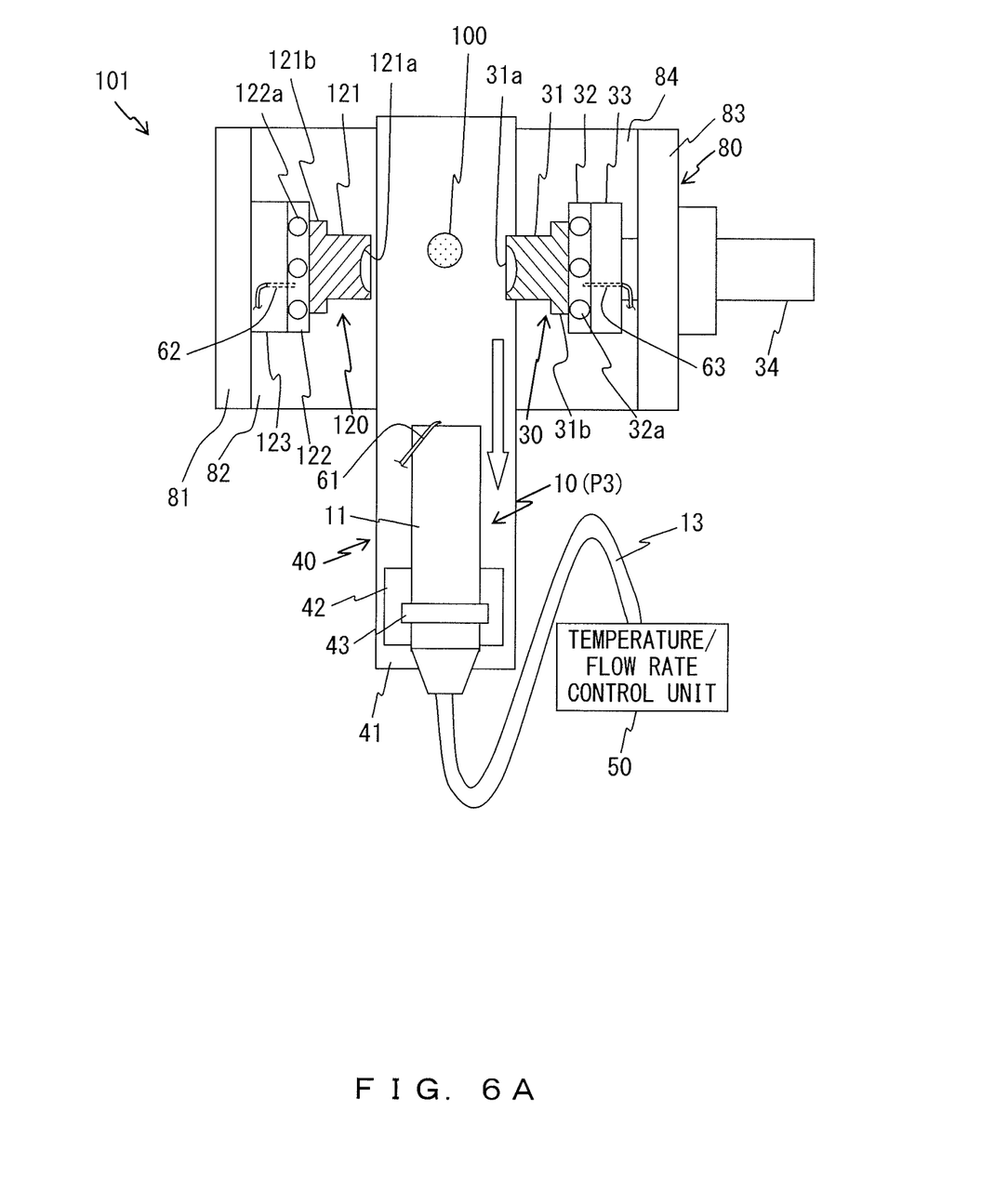
FIG. 6A is a first schematic front view of an apparatus for manufacturing an optical element used for explaining a method for manufacturing an optical element according to another embodiment of the present invention.
Figure 6B:
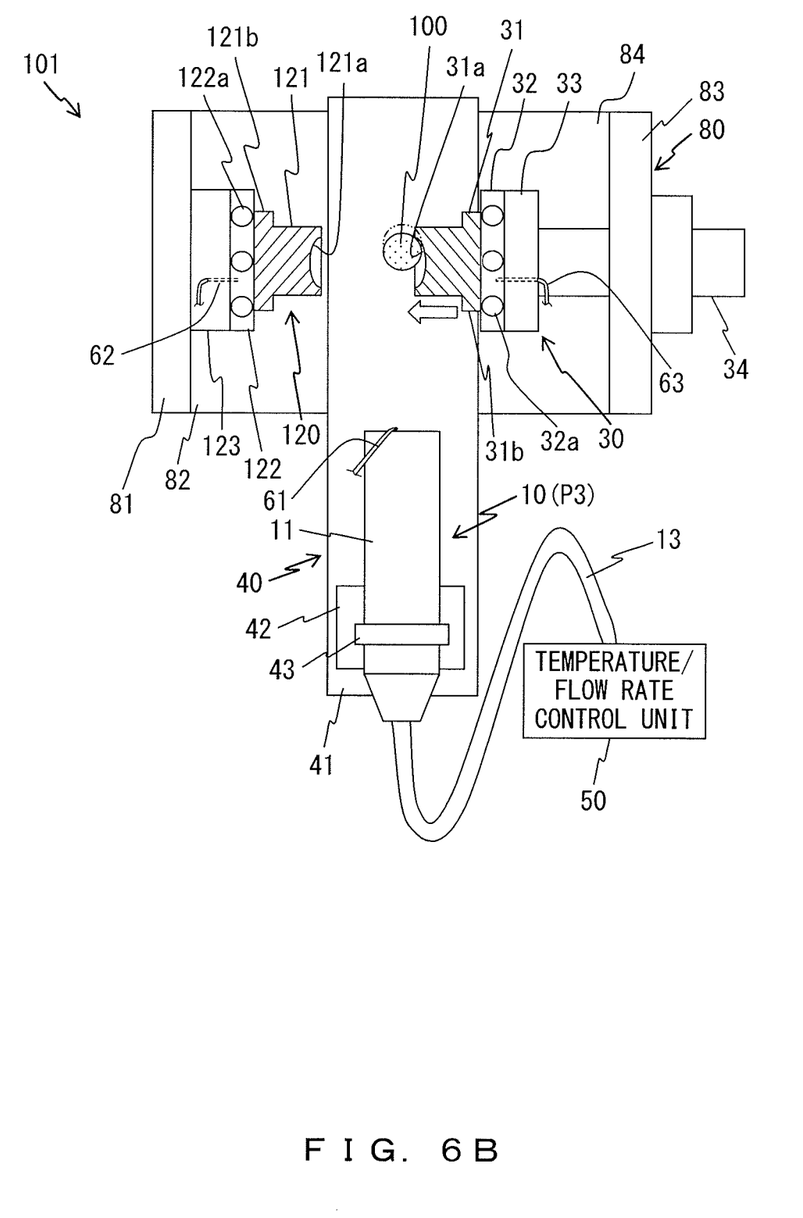
FIG. 6B is a second schematic front view of an apparatus for manufacturing an optical element used for explaining a method for manufacturing an optical element according to another embodiment of the present invention.
Figure 6C:
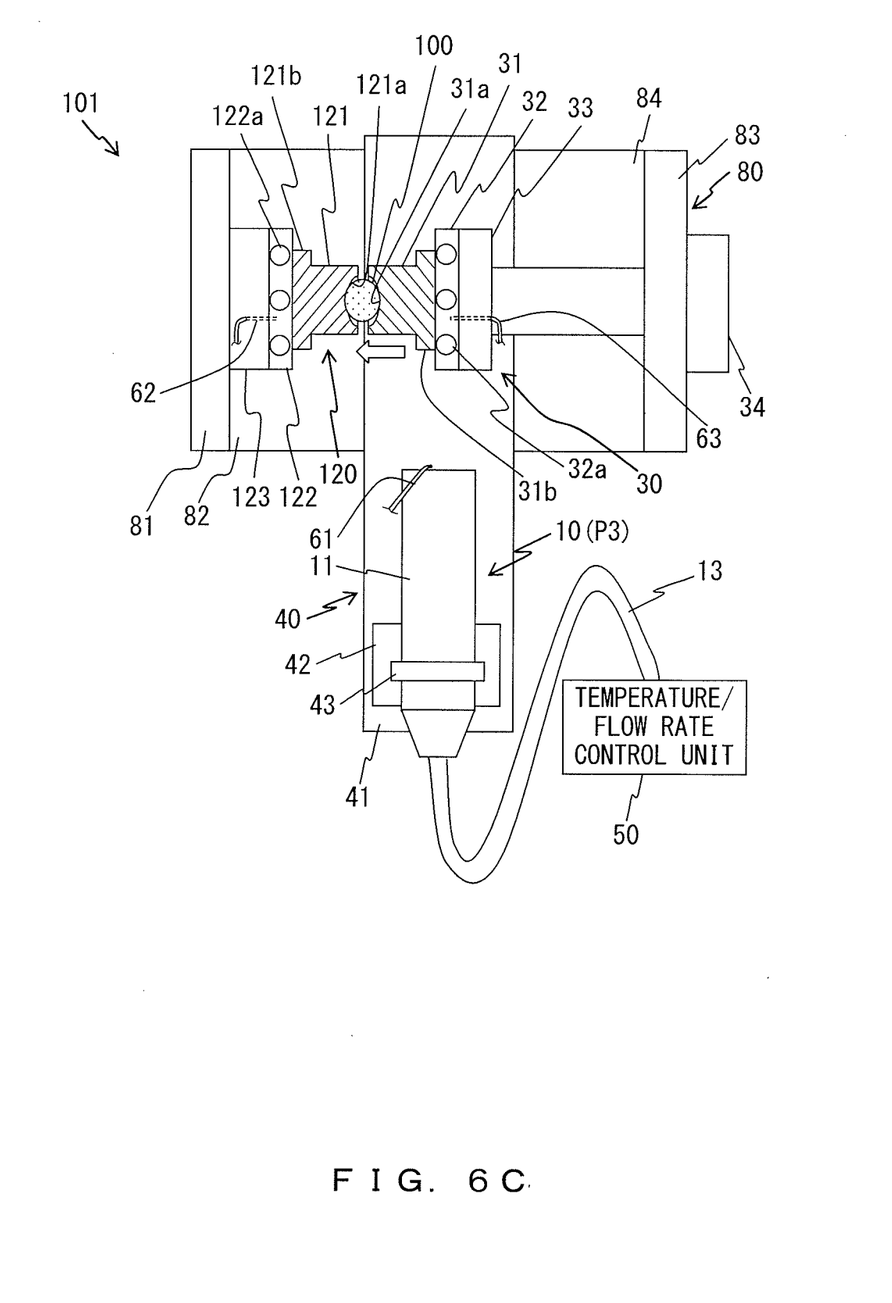
FIG. 6C is a third schematic front view of an apparatus for manufacturing an optical element used for explaining a method for manufacturing an optical element according to another embodiment of the present invention.

FIGS. 6A through 6C are schematic front views of an optical element manufacturing apparatus 101 for explaining a method for manufacturing an optical element according to other embodiments of the present invention.

The optical element manufacturing apparatus 101 according to the present embodiment is identical to the optical element manufacturing apparatus 1 according to the above embodiment except in that a first pressurizing unit 120 is of a fixed type instead of a movable type, such as the first pressurization unit 20 of the above embodiment, and in configurations related to this point. Accordingly, explanations about the configurations of the portions other than the first pressurizing unit 120 will be omitted.

As shown in FIG. 6A, the first pressurizing unit 120 has a shaping mold 121 on which a shaping surface 121a and a greater-diameter part 121b are formed, and which is arranged so as to be opposite to the second shaping mold 31, a heater plate 122, and a heat insulation plate 123 fixed at a side wall 81 of the frame 80. The heater plate 122 is an example of a mold heating unit. The first pressurizing unit 120 is identical to the first pressurization unit 20 of the above embodiment except for that the first pressurizing unit 120 does not have the cylinder 24, which is an example of a mold moving mechanism.

Note that because the first pressurizing unit 120 is a fixed type, the movement length of the second shaping mold 31 and the second pressurization unit 30 is twice the length in the above embodiment. Also, the thermocouple 63 of the second pressurization unit 30 has been inserted from an end plane on the side of the cylinder 34 of the heat insulation plate 33, while the thermocouple 62 of the first pressurizing unit 120 has been inserted from the peripheral plane of the heat insulation plate 33.

Hereinafter, explanations will be given for the flow of manufacturing an optical element from the optical element material 100. Identical portions as in the above explanations will appropriately be omitted.

First, after the heating step, the slider 42 in the heating-unit moving mechanism 40 moves vertically downward at a speed higher than, for example, the falling speed of the optical element material 100 due to gravity, as shown in FIG. 6A. Thereby, the heating-unit moving mechanism 40 moves vertically downward the heating unit 10 held by the holding unit 43 (position P3), and exposes the optical element material 100 to the outside of the heating unit 10 (exposure step).

A sensor not shown in the present embodiment (see the transmission sensor 70 shown in FIG. 1) detects the fact that at least part of the optical element material 100 has been exposed to the outside of the heating unit 10 (main body 11) (exposure detection step).

As shown in FIG. 6B, the cylinder 34 of the second pressurization unit 30 makes the second shaping mold 31 get closer to the first shaping mold 121 in the horizontal direction (opposite direction), which is an example of a direction that crosses the vertical direction, and thereby makes the second shaping mold 31 contact the 100. When this process is being performed, the optical element material 100 slightly moves downward from the exposure position due to gravity.

Thereafter, as shown in FIG. 6C, the cylinder 34 makes the second shaping mold 31 get further closer to the first shaping mold 121, and thereby makes the optical element material 100 move to the side of the first shaping mold 121 so that the first shaping mold 121 contacts the optical element material 100. Thereafter, the first shaping mold 121 and the second shaping mold 31 pressurize the optical element material 100 (pressurization step).

Note that the cylinder 34 makes the second shaping mold 31 move at a speed higher than, for example, the falling speed of the optical element material 100 so that the first shaping mold 121 contacts the optical element material 100 at the same time as the second shaping mold 31 contacts the optical element material 100 (within a range of 0.5 seconds) or substantially the same time (within a range of 2 seconds).

The optical element material 100 slightly moves downward due to gravity also after contacting the second shaping mold 31 and before contacting the first shaping mold 121.

Similarly to the above embodiment, the method for manufacturing an optical element in the present embodiment includes floating the optical element material 100 to heat it, and thereafter making the first shaping mold 121 and the second shaping mold 31 contact the floating optical element material 100 at the same time, and pressurize the optical element material 100 by using the first shaping mold 121 and the second shaping mold 31.

Thereby, it is possible to prevent a situation where heat exchange occurs between the optical element material 100 and only one of the first shaping mold 121 and the second shaping mold 31, causing uneven temperature distributions in the optical element material 100. Accordingly, the present embodiment can also prevent uneven temperature distributions from occurring in the optical element material 100 after it is floated in gas and heated.

What is claimed is:

1. A method for manufacturing an optical element, comprising:
   using gas to cause a mass made of an optical material to float inside a heating unit while it is being heated by the heating unit, the mass being subject to a gravitational pull in a downward vertical direction;
   while continuing to use the gas to cause the mass to float, moving the heating unit in the downward vertical direction at a speed greater than the speed at which the mass falls due to gravity such that the mass is located outside of the heating unit at a position above the heating unit and between first and second shaping molds;
   while the mass is located outside of the heating unit, moving the first and second shaping molds in a direction transverse to the downward vertical direction to cause the first and second shaping molds to contact the mass at the same time; and
   using the molds to apply pressure to the mass so as to shape the mass into an optical element.

2. The method for manufacturing an optical element according to claim 1, wherein the first and second shaping molds simultaneously contact the mass.

3. The method for manufacturing an optical element according to claim 1, wherein the mass floats within a heating chamber of the heating unit.

4. The method for manufacturing an optical element according to claim 3, wherein the heating chamber is cylindrical in shape.

5. The method for manufacturing an optical element according to claim 1, wherein the direction transverse to the downward vertical direction is perpendicular to the downward vertical direction.

6. The method for manufacturing an optical element according to claim 1, wherein while continuing to use the gas to cause the mass to float, the heating unit is moved in an upward direction relative to the downward vertical direction before it is moved in the downward vertical direction.

7. The method for manufacturing an optical element according to claim 1, wherein the mass falls in the downward vertical direction before it is contacted by the first and second shaping molds.

8. The method for manufacturing an optical element according to claim 1, further including the act of detecting that the mass is located outside of the heating unit and wherein the act of moving the first and second shaping molds is carried out after it has been detected that the mass is outside of the heating unit.

9. Apparatus for manufacturing an optical element, comprising:
   a heater for heating a mass made of an optical material, the heater including a gas source which will cause a mass placed inside the heater to float inside the heater such that the mass is subject to a gravitational pull in a downward vertical direction;
   first and second shaping molds;
   a first moving mechanisms which moves the heater in the downward vertical direction at a speed greater than the speed at which the mass would fall due to gravity while the gas source continues to cause the mass to float so as to move the mass to a location outside of the heating unit between the first and second shaping molds;
   a second moving mechanism which is adapted to move the first and second shaping molds in a direction transverse to the downward vertical direction while the mass is located outside of the heating unit to cause the first and second shaping molds to contact the mass at the same time, the second moving mechanism further causing the molds to apply pressure to the mass so as to shape the mass into an optical element.

10. The apparatus for manufacturing an optical element according to claim 9, wherein the first and second shaping molds simultaneously contact the mass.

11. The apparatus for manufacturing an optical element according to claim 9, wherein the mass floats within a heating chamber of the heating unit.

12. The apparatus for manufacturing an optical element according to claim 11, wherein the heating chamber is cylindrical in shape.

13. The apparatus for manufacturing an optical element according to claim 9, wherein the direction transverse to the downward vertical direction is perpendicular to the downward vertical direction.

14. The apparatus for manufacturing an optical element according to claim 9, wherein the first moving mechanism moves the heating unit is moved in an upward direction relative to the downward vertical direction before it is moved in the downward vertical direction, all while the gas causes the mass to float.

15. The apparatus for manufacturing an optical element according to claim 9, wherein the mass falls in the downward vertical direction before it is contacted by the first and second shaping molds.

16. The apparatus for manufacturing an optical element according to claim 9, further including a detector for detecting that the mass is located outside of the heating unit and wherein second moving mechanism moves the first and second shaping molds in the direction transverse to the downward vertical direction after it has been detected that the mass is outside of the heating unit.

* * * * *

UNITED STATES PATENT AND TRADEMARK OFFICE
CERTIFICATE OF CORRECTION

| | | |
|---|---|---|
| PATENT NO. | : 9,452,944 B2 | Page 1 of 1 |
| APPLICATION NO. | : 13/670709 | |
| DATED | : September 27, 2016 | |
| INVENTOR(S) | : Hironori Honji | |

It is certified that error appears in the above-identified patent and that said Letters Patent is hereby corrected as shown below:

TITLE PAGE

Assignee reads:

Olympus Corporation, Hachiojl-shi, Tokyo (JP)

Assignee should read:

Olympus Corporation, Hachioji-shi, Tokyo (JP)

Signed and Sealed this
Sixth Day of December, 2016

Michelle K. Lee
*Director of the United States Patent and Trademark Office*